(12) United States Patent
Gong et al.

(10) Patent No.: US 7,630,562 B2
(45) Date of Patent: Dec. 8, 2009

(54) METHOD AND SYSTEM FOR SEGMENTATION, CLASSIFICATION, AND SUMMARIZATION OF VIDEO IMAGES

(75) Inventors: Yihong Gong, Sunnyvale, CA (US); Xin Liu, San Jose, CA (US)

(73) Assignee: NEC Corporation, Tokyo (JP)

( * ) Notice: Subject to any disclaimer, the term of this patent is extended or adjusted under 35 U.S.C. 154(b) by 218 days.

(21) Appl. No.: 11/505,833

(22) Filed: Aug. 18, 2006

(65) Prior Publication Data

US 2006/0280365 A1  Dec. 14, 2006

Related U.S. Application Data

(62) Division of application No. 10/691,222, filed on Oct. 21, 2003, now Pat. No. 7,151,852, which is a division of application No. 09/556,349, filed on Apr. 24, 2000, now Pat. No. 7,016,540.

(60) Provisional application No. 60/167,230, filed on Nov. 24, 1999, provisional application No. 60/172,379, filed on Dec. 17, 1999.

(51) Int. Cl.
*G06K 9/00* (2006.01)
*G06K 9/46* (2006.01)
*G06K 9/68* (2006.01)
*H04N 7/12* (2006.01)

(52) U.S. Cl. .................. 382/219; 382/103; 382/106; 382/190; 375/240.08

(58) Field of Classification Search ............. 382/100, 382/103, 106, 130, 162, 164, 168–173, 181, 382/190–191, 199–219, 236; 375/240.08–240.18
See application file for complete search history.

(56) References Cited

U.S. PATENT DOCUMENTS 5,635,982 A * 6/1997 Zhang et al. ........... 348/231.99

(Continued)

OTHER PUBLICATIONS

D. DeMenthon, et al., "Video summarization by curve simplification," Tech Rep. LAMP-TR-018, Language and Media Processing Laboratory, University of Maryland, 1998.

(Continued)

*Primary Examiner*—Daniel G Mariam
*Assistant Examiner*—Manav Seth
(74) *Attorney, Agent, or Firm*—Sughrue Mion, PLLC (57) ABSTRACT

In a technique for video segmentation, classification and summarization based on the singular value decomposition, frames of the input video sequence are represented by vectors composed of concatenated histograms descriptive of the spatial distributions of colors within the video frames. The singular value decomposition maps these vectors into a refined feature space. In the refined feature space produced by the singular value decomposition, the invention uses a metric to measure the amount of information contained in each video shot of the input video sequence. The most static video shot is defined as an information unit, and the content value computed from this shot is used as a threshold to cluster the remaining frames. The clustered frames are displayed using a set of static keyframes or a summary video sequence. The video segmentation technique relies on the distance between the frames in the refined feature space to calculate the similarity between frames in the input video sequence. The input video sequence is segmented based on the values of the calculated similarities. Finally, average video attribute values in each segment are used in classifying the segments.

6 Claims, 5 Drawing Sheets

U.S. PATENT DOCUMENTS

| | | | |
|---|---|---|---|
| 5,642,294 | A * | 6/1997 | Taniguchi et al. ............ 348/700 |
| 5,692,063 | A * | 11/1997 | Lee et al. .................... 382/107 |
| 5,734,735 | A | 3/1998 | Coleman, Jr. |
| 5,796,855 | A * | 8/1998 | Lee ............................ 382/107 |
| 5,818,439 | A | 10/1998 | Nagasaka et al. |
| 5,911,008 | A | 6/1999 | Niikura et al. |
| 5,956,026 | A | 9/1999 | Ratakonda |
| 6,026,182 | A * | 2/2000 | Lee et al. .................... 382/173 |
| 6,072,903 | A * | 6/2000 | Maki et al. ................... 382/190 |
| 6,075,875 | A * | 6/2000 | Gu .............................. 382/107 |
| 6,172,685 | B1 | 1/2001 | Pandit |
| 6,195,458 | B1 | 2/2001 | Warnick et al. |
| 6,256,419 | B1 * | 7/2001 | Nagasaka et al. ........... 382/236 |
| 6,282,461 | B1 * | 8/2001 | Gan et al. .................... 700/258 |
| 6,393,054 | B1 | 5/2002 | Altunbasak et al. |
| 6,404,925 | B1 | 6/2002 | Foote et al. |
| 6,421,454 | B1 * | 7/2002 | Burke et al. ................. 382/131 |
| 6,496,228 | B1 | 12/2002 | McGee et al. |
| 6,529,613 | B1 * | 3/2003 | Astle ........................... 382/103 |
| 6,535,639 | B1 | 3/2003 | Uchihachi et al. |
| 6,574,378 | B1 | 6/2003 | Lim |
| 6,807,306 | B1 * | 10/2004 | Girgensohn et al. ......... 382/225 |
| 6,842,197 | B1 | 1/2005 | Llach-Pinsach et al. |
| 7,151,852 | B2 * | 12/2006 | Gong et al. .................. 382/173 |

OTHER PUBLICATIONS

M. Yeung, et al., "Video browsing using clustering and scene transitions on compressed sequences," in *Proc. SPIE on Multimedia Computing and Networking*, vol. 2417, 1995.

A. Girgensohn et al., "Time-constrained keyframe selection technique," in *Proc. IEEE Multimedia Computing and Systems (ICMCS'99)*, 1999.

W. Press et al., "2.6 Singular Value Decomposition", *Numerical Recipes in C: The Art of Scientific Computing*, Cambridge, England: Cambridge University Press, 2 ed., 1992, pp. 59-70.

J. Boreczky et al., "Comparison of video shot boundary detection techniques," in *Proceedings of SPIE: Storage and Retrieval for Image and Video Databases* IV, vol. 2670, 1996.

M.W. Berry et al., "Using Linear Algebra for Intelligent Information Retrieval," Dec. 1994, *Computer Science Department*, Univ. of Tennessee.

* cited by examiner

METHOD AND SYSTEM FOR SEGMENTATION, CLASSIFICATION, AND SUMMARIZATION OF VIDEO IMAGES

This is a divisional of U.S. application Ser. No. 10/691,222, filed Oct. 21, 2003 now U.S. Pat. No. 7,151,852, which is a divisional of U.S. application Ser. No. 09/556,349, filed Apr. 24, 2000 now U.S. Pat. No. 7,016,540, which claims benefit from Provisional Application No. 60/167,230, filed Nov. 24, 1999, and Provisional Application No. 60/172,379, filed Dec. 17, 1999. The disclosures of these applications are incorporated herein by reference.

BACKGROUND OF THE INVENTION

1. Field of the Invention

This invention relates to techniques for video summarization based on the singular value decomposition (SVD) technique. The present invention also relates to providing tools for effective searching and retrieval of video sequences according to user-specified queries. In particular, the invention relates to segmentation of video sequences into shots for automated searching, indexing, and access. Finally, this invention relates to a method for extracting of features and metadata from video shots to enable classification, search, and retrieval of the video shots.

2. Description of the Related Art

The widespread distribution of video information in computer systems and networks has presented both excitement and challenge. Video is exciting because it conveys real-world scenes most vividly and faithfully. On the other hand, handling video is challenging because video images are represented by voluminous, redundant, and unstructured data streams which span the time sequence. In many instances, it can be a painful task to locate either the appropriate video sequence or the desired portion of the video information from a large video data collection. The situation becomes even worse on the Internet. To date, increasing numbers of websites offer video images for news broadcasting, entertainment, or product promotion. However, with very limited network bandwidth available to most home users, people spend minutes or tens of minutes downloading voluminous video images, only to find them irrelevant.

Important aspects of managing a large video data collection are providing a user with a quick summary of the content of video footage and enabling the user to quickly browse through extensive video resources. Accordingly, to turn unstructured, voluminous video images into exciting, valuable information resources, browsing and summarization tools that would allow the user to quickly get an idea of the overall content of video footage become indispensable.

Currently, most video browsing tools use a set of keyframes to provide content summary of a video sequence. Many systems use a constant number of keyframes for each detected scene shot, while others assign more keyframes to scene shots with more changes. There are also systems that remove redundancies among keyframes by clustering the keyframes based on their visual similarity. An important missing component in existing video browsing and summarization tools is a mechanism to estimate how many keyframes would be sufficient to provide a good, nonredundant representation of a video sequence.

Simple methods that assign a fixed number of keyframes to each scene shot suffer from poor video content representation, while more sophisticated approaches that adaptively assign keyframes according to the activity levels often rely on the user to provide either the number of keyframes to be generated, or some threshold values (e.g., the similarity distance or the time interval between keyframes), which are used to generate the keyframes. Accordingly, the user must go through several rounds of interactions with the system to obtain an appropriate set of keyframes. This approach is acceptable when the user browses a small set of video images disposed on a local workstation. On the other hand, the approach becomes prohibitive when video images located on the Internet are accessed through a network with very limited bandwidth, or when a video summary must be created for each video image in a large-scale video database.

As mentioned above, existing video browsing and content overview tools utilize keyframes extracted from original video sequences. Many works concentrate on breaking video into shots, and then finding a fixed number of keyframes for each detected shot. For example, Tonomura et al. used the first frame from each shot as a keyframe, see Y. Tonomura, A. Akutsu, K. Otsuji, and T. Sadakata, "Videomap and videospaceicon: Tools for anatormizing video content," in Proc. ACM INTER CHI'93, 1993. Ueda et al. represented each shot by using its first and last frames, see H. Ueda, T. Miyatake, and S. Yoshizawa, "Impact: An interactive natural-motion-picture dedicated multimedia authoring system," in Proc. ACM SIG-CHI$\pi$91, (New Orleans), April 1991. Ferman and Tekalp clustered the frames in each shot, and selected the frame closest to the center of the largest cluster as the keyframe, see A. Fermain and A. Tekalp, "Multiscale content extraction and representation for video indexing," in Proc. SPIE 3229 on Multimedia Storage and Archiving Systems II, 1997.

An obvious disadvantage of the above equal-density-keyframe assignment is that long shots, which involve camera pans and zooms as well as the object motion, will not be adequately represented. To address this problem, DeMenthon et al. proposed to assign keyframes of a variant number according to the activity level of the corresponding scene shot, see D. DeMenthon, V. Kobla, and D. Doermann, "Video summarization by curve simplification," Tech. Rep. LAMP-TR-018, Language and Media Processing laboratory, University of Maryland, 1998. The described method represents a video sequence as a trajectory curve in a high dimensional feature space, and uses a recursive binary curve splitting algorithm to find a set of perceptually significant points, which can be used in approximating the video curve. The curve approximation is repeated until the approximation error comes below the user-specified value. Frames corresponding to these perceptually significant points are then used as keyframes to summarize the video contents. Because the curve splitting algorithm assigns more points to segments with larger curvature, this method naturally assigns more keyframes to shots with more variations.

Keyframes extracted from a video sequence may contain duplications and redundancies. For example, in a TV program with two people talking, the video camera usually switches back and forth between the two persons, and inserts some global views of a scene. Applying the above keyframe selection methods to this video sequence will generate many keyframes that are almost identical. To remove redundancies from the produced keyframes, Yeung et al. selected one keyframe from each video shot, performed hierarchical clustering on these keyframes based on their visual similarity and temporal distance, and then retained only one keyframe for each cluster, see M. Yeung, B. Yeo, W. Wolf, and B. Liu, "Video browsing using clustering and scene transitions on compressed sequences," in Proc, SPIE on Multimedia Computing and Networking, vol. 2417, 1995. Girgensohn and Boreczky also applied the hierarchical clustering technique to group the keyframes into as many clusters as specified by the user. For each cluster, a single keyframe is selected such that the constraints dictated by the requirement of an even distribution of keyframes over the length of the video and a minimum distance between keyframes are met, see A. Girgensohn and J. Boreczky, "Time-constrained keyframe selection technique," in *Proc. IEEE Multimedia Computing and Systems* (ICMCS'99), 1999.

To create a concise summary of video contents, it is very important to ensure that the summarized representation of the original video (1) contains little redundancy, and (2) gives equal attention to the same amount of contents. While some of the sophisticated keyframe selection methods address these two issues to variant extents, they often rely on the users to provide either the number of keyframes to be generated, or some thresholds (e.g., a similarity distance between keyframes or approximation errors), which are used in keyframe generation. Accordingly, an optimal set of keyframes can be produced only after several rounds of trials. On the other hand, excessive trials could become prohibitive when video images are accessed through a connection with limited bandwidth, or when a keyframe-set must be created for each video image in a large-scale video database.

Apart from the above problems of keyframe selection, summarizing video contents using keyframes has its own limitations. A video image is a continuous recording of a real-world scene. A set of static keyframes by no means captures the dynamics and the continuity of the video image. For example, in viewing a movie or a TV program, the user may well prefer a summarized motion video with a specified time length to a set of static keyframes.

A second important aspect of managing video data is providing tools for efficient searching and retrieval of video sequences according to user-specified queries. It can be a painful task to find either an appropriate video sequence, or the desired portions of the video hidden within a large video data collection. Traditional text indexing and retrieval techniques have turned out to be powerless in indexing and searching video images. To tap into the rich and valuable video resources, video images must be transformed into a medium that is structured, manageable and searchable.

The initial steps toward the aforementioned goal include the segmentation of video sequences into shots for indexing and access, and the extraction of features/metadata from the shots to enable their classification, search, and retrieval. For video shot segmentation, a number of methods have been proposed in past years. Typical video shot segmentation methods include shot segmentation using pixel values, described in K. Otsuji, Y. Tonomura, and Y. Ohba, "Video browsing using brightness data," in *SPIE Proc. Visual Communications and Image Processing*, (Boston), pp. 980-989, 1991, and A. Hampapur, R. Jain, and T. Weymouth, "Digital video segmentation," in *Proceedings of ACM Multimedia 94*, (San Francisco), October 1994. Another video segmentation method, described in H. Ueda, T. Miyatake, and S. Yoshizawa, "Impact: An interactive natural-motion-picture dedicated multimedia authoring system," in *Proc. ACM SIGCHI'91*, (New Orleans), April 1991, relies on global or local histograms. The use of motion vectors in video segmentation is described in H. Ueda, et al., see above. Discrete cosine transform (DCT) coefficients from MPEG files can also be used for video shot segmentation, see F. Arman, A. Hsu, and M. Y. Chiu, "Image processing on encoded video sequences," Multimedia Systems, vol. 1, no. 5, pp. 211-219, 1994.

Apart from the aforementioned methods, many other video segmentation techniques have been developed recently. While the vast majority of video segmentation methods use a simple approach of frame-pair comparisons and can detect only abrupt shot boundaries, some more sophisticated segmentation techniques use additional frames in the aforementioned comparison operation to provide for the detection of gradual scene changes, see H. Zhang, A. Kankanhalli, and S. Smoliar, "Automatic partitioning of full-motion video," Multimedia Systems, vol. 1, pp. 10-28, 1993. As it pertains to the video shot retrieval and classification, the most common approach to date has been to first carry out the video shot segmentation, perform additional operations to extract features from each detected shot, and then create indices and metrics using the extracted features to accomplish shot retrieval and classification. In systems based on this described approach, several of the aforementioned processing steps must be performed simultaneously. As a result, these systems usually suffer from high computational costs and long processing times.

Accordingly, there is a recognized need for, and it would be advantageous to have an improved technique that aims to automatically create an optimal and non-redundant summarization of an input video sequence, and to support different user requirements for video browsing and content overview by outputting either the optimal set of keyframes, or a summarized version of the original video with the user-specified time length.

There is also a demand for, and it would be advantageous to have an improved technique for segmenting video sequences into shots for indexing and access, and the extracting features/metadata from the segmented shots to enable their classification, search, and retrieval.

SUMMARY OF THE INVENTION

Accordingly, it is one object of the present invention to provide an improved technique for automatically creating an optimal and nonredundant video sequence summarization.

It is another object of the invention to provide a method and system for effective video segmentation and classification.

To achieve the above and other features and realize the benefits and advantages of the invention, there is provided a method and system for video summarization using singular value decomposition. For an input video sequence, the inventive method creates a feature-frame matrix A, and performs a singular value decomposition thereon. From this singular value decomposition, the present invention derives a refined feature space having fewer dimensions, and a metric to measure the degree of visual changes of each video segment in the input video sequence. In the refined feature space, the content value of a video segment is measured using its degree of visual changes.

For the input video sequence, the inventive method finds the most static video segment, defines it as an information unit, and uses the content value computed from this segment as a threshold to cluster the remaining frames in the video sequence. Using this clustering result, either an optimal set of keyframes, or a summarized motion video with a user-specified time length is generated.

Another aspect of the invention is a method and system for video segmentation and classification. According to the inventive method, a similarity is computed between each of the frames in the input video sequence and a precedent or subsequent frame. The input video sequence is then segmented into a plurality of shots according to the computed similarity values. The similarity metric is defined using the properties of the singular value decomposition. This similarity metric is also used in the application of retrieving visually similar video frames.

In addition to the above similarity metric, a metric to measure the evenness of the color distribution of a frame is also derived from properties of the singular value decomposition to facilitate video classification.

Other aspects of the inventive method include arranging the selected frames into a feature frame matrix, and performing the singular value decomposition on this feature frame matrix. Performing a singular value decomposition also produces a matrix, each column thereof representing a frame in the refined feature space corresponding to a frame in the input video sequence.

In another aspect, features are extracted from each of the shots.

According to the inventive method, the similarity between frames in the input video sequence can be determined using a refined feature space representation of the input video sequence.

Further improvements include comparing the computed similarity to at least two threshold similarities and segmenting the input video sequence according to the result of this comparison.

The methods according to the exemplary embodiments of the present invention as described above, can also be embodied as computer readable program stored in a computer readable storage medium.

BRIEF DESCRIPTION OF THE DRAWINGS

The above and other objects and advantages of the present invention will no doubt become clear and apparent from the following detailed description of preferred embodiments thereof with reference to the attached drawing, wherein.

DETAILED DESCRIPTION OF PREFERRED EMBODIMENTS

The inventive video summarization technique aims to automatically create an optimal and nonredundant video summarization. The invention also seeks to fulfill different user requirements for video browsing and content overview by outputting either an optimal set of keyframes representing the input video sequence, or a summarized motion video of the original video with the user specified time length.

The inventive video summarization method uses the aforementioned singular value decomposition as its basic working instrument. Singular value decomposition is known for its capabilities of deriving a low dimensional refined feature space from a high dimensional raw feature space, and of capturing the essential structure of a data set in the feature space. See S. Deerwester, S. Dumais, G. Purnas, T. Landauer, and R. Harshman, "Indexing by latent semantic analysis," *Journal of the American Society for Information Science,* vol. 41, pp. 391-407, 1990. To reduce the number of frames to be processed by the singular value decomposition, the present invention selects a set of frames that are evenly spaced in the input video sequence (preferably one from every ten frames). For each frame i in this sampling set, the inventive technique creates an m-dimensional feature vector $A_i$. Using $A_i$ as a column, the invention obtains a feature-frame matrix $A=[A_1, A_2 \ldots A_n]$. Performing subsequent singular value decomposition on this matrix A projects each frame i from the m-dimensional raw feature space into a κ-dimensional refined feature space (usually κ<<m, though this is not required). In this new feature space, noise and trivial variations in video frames are ignored, and frames with similar color distribution patterns are mapped near to each other. Therefore, the κ-dimensional vectors representing each of the frames in the refined feature space can be used not only for clustering visually similar frames for content summarization, but also for accurately segmenting video frames into shots, and also for similarity matching among the detected shots.

It will be also appreciated by those of skill in the art that, in the refined feature space, there is a strong correlation between the degree of visual changes in a frame cluster and the locations at which its constituent frames are projected. For many video images, the degree of visual changes is a good indicator of the level of activity in the images. Taking the video footage only, a static video with almost no changes conveys less information than a dynamic video with abundant changes. Based on the foregoing property of the refined feature space, the content value in a video segment is determined using the locations of its constituent frames in the refined feature space.

Accordingly, in order to summarize the input video according to its content value, the inventive method first finds the frame cluster in the refined feature space that corresponds to the most static video segment, defines it as an information unit, and uses the content value computed from this frame cluster as a threshold to cluster the rest of the frames in the refined feature space. After the clustering is complete, the inventive method selects a keyframe from each cluster, the selected keyframe being a frame closest to the center of the cluster. Thus, the inventive approach ensures that the obtained keyframe set contains little redundancy and gives equal attention to the same amount of contents. To support different user requirements for video browsing and content overview, the inventive system is able to output either the optimal set of keyframes, or a summarized motion video of the original video with the user specified time length.

In addition to the strong correlation between the degree of visual changes in a video segment and the locations in the refined feature space at which the constituent frames of the video segment are projected, a similar correlation exists between the evenness of color distribution in a video frame, and the location of the frame projections. This important property makes singular value decomposition extremely useful for video shot classification. While the degree of visual changes represents the dynamic level of a video segment, the evenness of color distribution reflects its color appearance. The aforementioned properties of singular value decomposition enables the realization of optimal video summarization, accurate video shot segmentation, and effective visual content-based shot classification.

Preferred embodiments of the inventive video summarization and shot segmentation methods will now be described in detail.

Exemplary Construction of a Feature Vector

The video frames of the input video sequence are represented in the method according to an embodiment of the present invention using color histograms. The use of such histograms enables very effective detection of overall differences in image frames in addition, computations involving histograms have been known to be very cost-effective. This cost-effective property ensures the feasibility and scalability of the inventive method in handling long video sequences.

In one embodiment of the inventive method, three-dimensional histograms in the red-green-blue (RGB) color space are created with five bins for each of R, G, and B, primary colors respectively, resulting in a total of 125 bins. To incorporate the information on the spatial distribution of colors in the video frames, each frame is divided into nine blocks, preferably in a three-by-three manner. The aforementioned three-dimensional color histograms are created for each of the nine blocks. These nine histograms are then concatenated together to form a 1125-dimensional feature vector for the frame. Using the feature vector of frame i as the i'th column, the inventive method creates the feature-frame matrix A representing the input video sequence. Because a small image block does not normally contain a complete color palette, matrix A is usually sparse. Therefore, the present invention uses singular value decomposition algorithms for sparse matrices, which are much faster and memory efficient compared to the conventional singular value decomposition algorithms.

Any image features that can be encoded into a vector of a fixed length can be utilized in this inventive method. Alternatively, the feature vector of an image frame can be constructed using a Fourier transformation. As will be undoubtedly appreciated by those of skill in the art, the Fourier feature vector is constructed through a convolution of the image color information using a set of Fourier kernels, for instance sine and cosine. In such case, the coordinates of the feature vector would represent the frequencies of the color distributions within the image.

Yet alternatively, such a feature vector can be constructed using the Wavelet procedure, which is similar to the aforementioned Fourier transformation, except it utilizes a different kernel function, the construction of which is well known in the art.

Singular Value Decomposition

The inventive video summarization, shot segmentation and classification methods are based on the singular value decomposition, which is defined as follows. Given an m×n matrix A, where m≧n, the singular value decomposition of A is defined as:

$$A = U\Sigma V^T \qquad (1)$$

where $U=[u_{ij}]$ is an m×n column-orthonormal matrix whose columns are called left singular vectors; $\Sigma=\text{diag}(\sigma_1, \sigma_2, \ldots, \sigma_n)$ is an n×n diagonal matrix whose diagonal elements are non-negative singular values sorted in descending order, and $V=[v_{ij}]$ is an n×n orthonormal matrix whose columns are called right singular vectors. Additional information on the singular value decomposition can be found in W. Press et al., *Numerical Recipes in C: The Art of Scientific Computing*, Cambridge, England, Cambridge University Press, 2ed., 1992. If rank(A)=r, then $\Sigma$ satisfies $$\begin{cases} \sigma_i > 0 : 1 \le i \le r \\ \sigma_i = 0 : i > r \end{cases} \qquad (2)$$

In the inventive video summarization method, applying singular value decomposition to the feature-frame matrix A can be interpreted as follows. The singular value decomposition derives a mapping between the m-dimensional raw feature space occupied by the color histograms and the r-dimensional refined feature space with all of its axes linearly-independent. Accordingly, the singular value decomposition transforms each column vector i of the matrix A, which represents the concatenated color histogram of frame i, into a row vector $[v_{i1} \, v_{i2} \, \ldots \, v_{in}]$ of the matrix V. The singular value decomposition also maps each row vector j of the matrix A, which carries the information on the occurrence count of the concatenated histogram entry j in each of the video frames, into row vector $[u_{j1} \, u_{j2} \, \ldots \, u_{jn}]$ of the matrix U.

The singular value decomposition requires the number of rows m of the matrix A to be greater than or equal to its number of columns n. If the number of the selected frames in the input video sequence is greater than the number of elements in each of the concatenated color histograms, the singular value decomposition must be carried out on $A^T$, and consequently, the roles of the matrices U and V, which have been set forth above, will be exchanged. For simplicity, and without loss of generality, only the processing of the matrix A will be described hereinbelow.

The singular value decomposition has the following additional important property, which has been widely utilized for text indexing and retrieval. The formal proof of that property can be found in G. Golub and C. Loan, *Matrix Computations*, Baltimore, Johns-Hopkins, 2 ed., 1989.

Property 1. Let the singular value decomposition of matrix A be given by Equation (1), $U=[U_1 U_2 \ldots Un]$, $V=[V_1 V_2 \ldots Vn]$, and $\sigma_1 \ge \sigma_2 \ldots \ge \sigma_r > \sigma_{r+1} = \ldots = \sigma_n = 0$. Then, matrix $A_\kappa$, defined below is the closest rank-κ matrix to A for the Euclidean and Frobenius norms.

$$A_\kappa = \sum_{i=1}^{\kappa} U_i \cdot \sigma_i \cdot V_i^T \qquad (3)$$

The use of κ-largest singular values to approximate the original matrix with the expression of the Equation (3) has significant implications. Discarding small singular values is equivalent to discarding linearly semi-dependent axes of the feature space. The image features corresponding to the discarded axes are practically nonessential for representing the contents of the images in the video sequence.

On the other hand, the truncated refined feature space captures the most of the important underlying structure of the color histograms and the associated video frames, yet at the same time removes the noise or trivial variations in the video frames. Minor differences between the color histograms will be ignored, and video frames with similar color distribution patterns will be mapped near each other in the c-dimensional refined feature space. The value of κ is a design parameter. Preferably, κ=150. Experiments have shown that this value of κ gives satisfactory video summarization results.

Video Summarization Based on Singular Value Decomposition

Besides the aforementioned properties, singular value decomposition has the following important feature, which provides a basis for the inventive video summarization system.

Property 2. The singular value decomposition of A is given by Equation (1), wherein $A=[A_1 \ldots A_i \ldots A_n]$, $V^T=[\psi_1 \ldots \psi_i \ldots \psi_n]$, and $\psi_i=[v_{i1} v_{i2} \ldots v_{in}]^T$. The distance of $\psi_i$ to the origin of the refined feature space can be defined as:

$$\|\psi_i\| = \sqrt{\sum_{j=1}^{rank(A)} v_{ij}^2} \ . \tag{4}$$

If rank(A)=n, then, from the orthonormal property of matrix V, $\|\psi_i\|^2=1$, where i=1,2, ..., n. If $$A' = [A_1 \ldots A_i^{(1)} \overbrace{\ldots A_i^{(k)}}^{k} \ldots A_n]$$

is the matrix obtained by duplicating column vector $A_i$ in A k times ($A_i^{(1)}=\ldots=A_i^{(k)}=A_i$), and $V'^T=[\psi'_1 \ldots \varnothing'_1 \ldots \varnothing'_k \ldots \psi'_n]$ is the corresponding right singular vector matrix obtained from the singular value decomposition, then $\|\varnothing'_j\|^2=1/k$, where j=1, 2, ..., k.

The above property indicates that if a column vector $A_i$ of the matrix A is linearly-independent, the singular value decomposition operation projects it into a vector $\psi_i$, whose distance in the refined feature space defined by Equation (4) equals one. When $A_i$ has some duplicates $A_i^{(j)}$, the distance of the projected vector $\varnothing'_j$ decreases. The more duplicates $A_i$ has, the shorter the distance $\varnothing'_j$ has.

As it pertains to the video domain, the above property of the singular value decomposition provides that the frames in a static video segment (e.g., segments involving anchorpersons or weather maps) will be projected into the locations which are close to the origin of the refined feature space, while frames in video segments containing a lot of changes (e.g., segments containing moving objects, camera pan and zoom) will be projected into the points farther from the origin. In other words, the location at which the video segment is projected provides information on the degree of visual changes in the segment.

From the viewpoint of content value, a static video with insubstantial visual changes conveys less information than a dynamic video with lots of changes. Because the degree of visual changes in a video segment Si has a strong correlation with the locations at which its constituent frames are projected in the refined feature space, the following quantity can be used as a measure of the content value contained in cluster (video segment) $S_i$:

$$INF(S_i) = \sum_{\psi_i \in S_i} \|\psi_i\|^2 \tag{5}$$

The inventive system utilizes the content value defined in accordance with above equation (5) in the following manner. The inventive system first finds a cluster closest to the origin in the refined feature space, which corresponds to the most static video segment in the input video sequence. This most static video segment is subsequently defined as an information unit and the content value computed from the segment is used as a threshold to cluster the rest of the frames in the input video sequence. Thus, the inventive approach ensures that the summarized representation of the original video contains little redundancy and gives equal attention to the same amount of contents.

Figure 1:
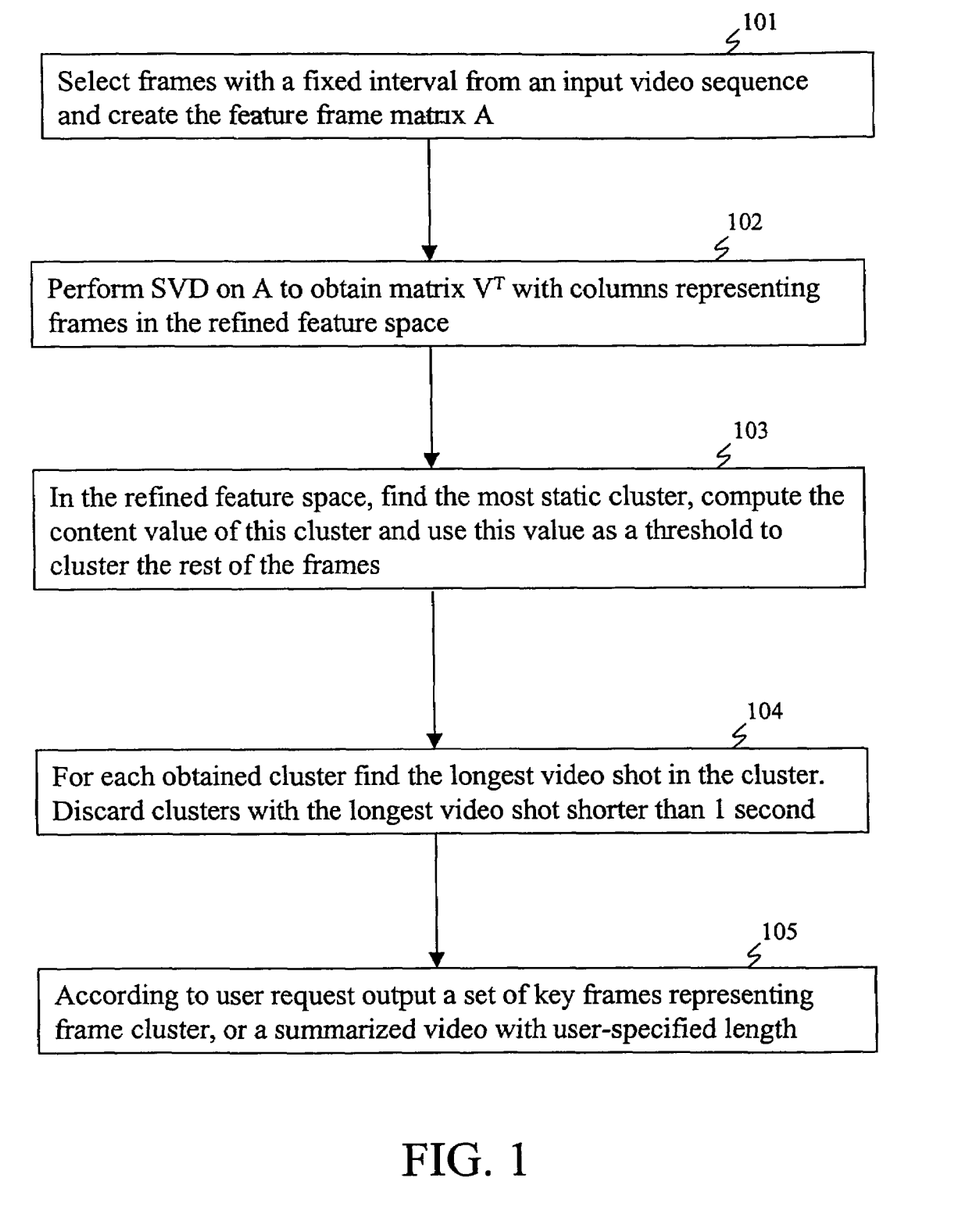
FIG. 1 is the block diagram of the inventive video summarization method.

Accordingly, an embodiment of the inventive video summarization method comprises the following major processing steps, as shown in FIG. 1:

Step 101. Select frames with a fixed interval (preferably a 10-frame interval) from the input video sequence, and create the feature-frame matrix A using these selected frames.

Step 102. Perform singular value decomposition on the matrix A to obtain the matrix $V^T$, each column vector $\psi_i$ of this matrix representing frame i in the refined feature space.

Step 103. In the refined feature space, find the most static cluster, compute the content value of this cluster using Equation (5), and use this value as a threshold to cluster the rest of the frames in the input video sequence.

Step 104. For each obtained cluster $S_i$ find the longest video shot $\Theta_i$ contained in the cluster. Discard the cluster whose $\Theta_i$ is shorter than one second.

Step 105. According to the user's request, output either a set of keyframes, each keyframe representing a video cluster, or a summarized motion video with the user specified time length.

Figure 2:
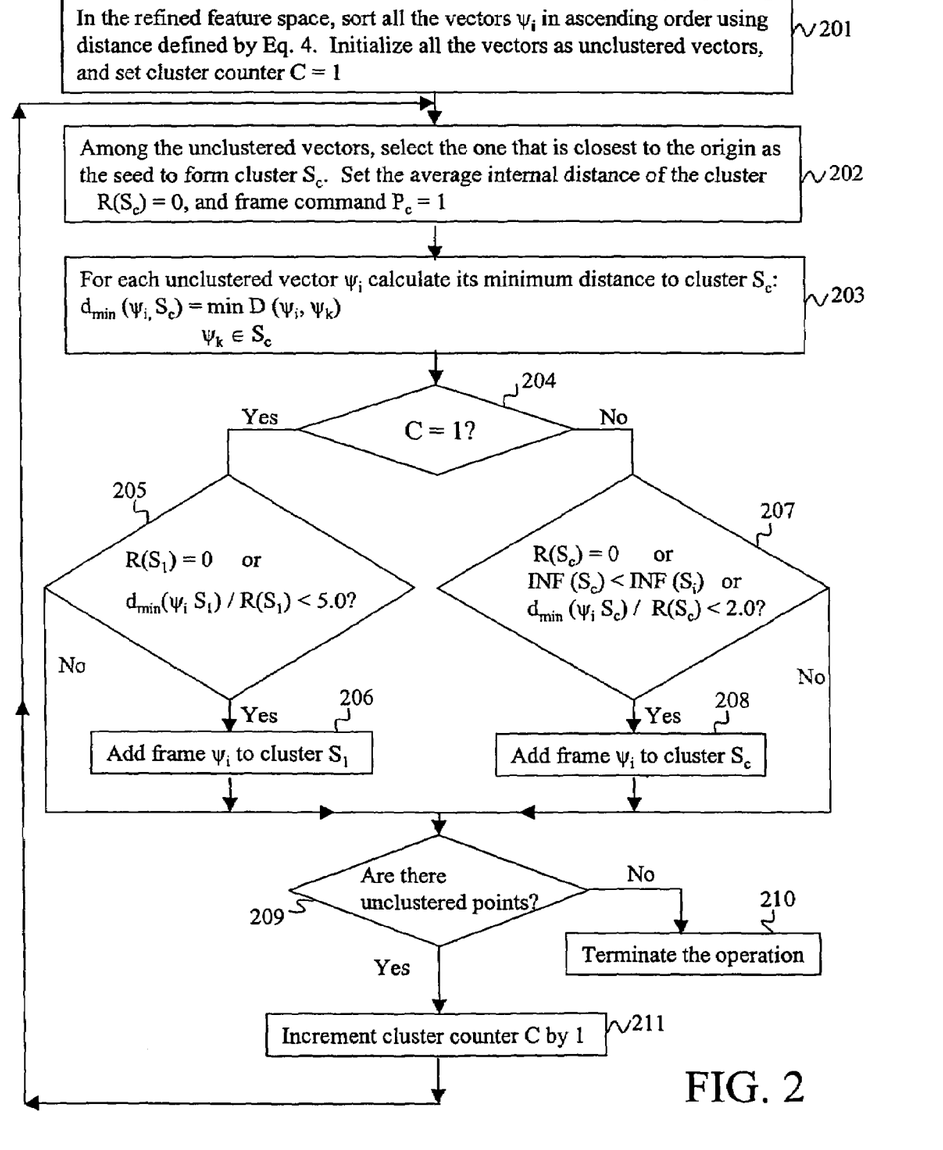
FIG. 2 is the block diagram of the inventive clustering method.

As will be appreciated by those of skill in the art, in Step 103 of the above procedure, finding the most static cluster is equivalent to finding a cluster closest to the origin of the refined feature space. With reference to the used notations, the entire clustering process can be described as follows, with reference to FIG. 2:

Step 201. In the refined feature space, sort all the vectors $\psi_i$ in ascending order using the distance defined by Equation (4). Initialize all the vectors as unclustered vectors, and set the cluster counter C=1.

Step 202. Among the unclustered vectors, find a vector closest to the origin of the refined feature space, and select this vector as a seed vector to form cluster $S_c$. Set the average internal distance of the cluster $R(S_c)=0$, and the frame count $P_c=1$.

Step 203. For each unclustered vector $\psi_i$, calculate its minimum distance to the cluster $S_c$, which is defined as:

$$d_{min}(\psi_i, S_c) = \min_{\psi_K \in S_c} D(\psi_i, \psi_k) \tag{6}$$

wherein $D(\psi_i, \psi_k)$ is defined as the Euclidean distance weighted by the aforementioned singular values. Using the notation associated with Equation (1), the aforementioned Euclidean distance is:

$$D(\psi_i, \psi_k) = \sqrt{\sum_{j=1}^{K} \sigma j(v_{ij} - v_{kj})^2} \ , \tag{7}$$

wherein κ is the reduced dimension of the refined feature space.

In Step 204 if cluster counter C=1, go to Step 205 below; otherwise, go to Step 207 below.

In Step 206 add frame $\psi_i$ to cluster $S_1$ if, in Step 205

$R(S_1)=0$ or $d_{min}(\psi_i, S_1)/R(S_1) <5.0$

In Step 208, add frame $\psi_i$ to cluster $S_c$ if, in Step 207

$R(S_c) = 0$ or $INF(S_c) < INF(S_1)$ or $d_{min}(\psi_i, S_c)/R(S_c) < 2.0$

If frame $\psi_i$ is added to cluster $S_c$, increment frame count $P_c$ by one, update the content value $INF(S_c)$ using Equation (5), and update $R(S_c)$ as follows:

$$R(S_c) = \frac{(P_c - 1)R(S_c) + d_{\min}(\psi_i, S_c)}{P_c} \quad (8)$$

Step 209. If there exist unclustered points, increment the cluster counter C by one, and go to Step 202; otherwise, terminate the operation.

It should be noted that in the above operations, different conditions are used for growing the first and the rest of clusters. The first cluster relies on the distance variation $d_{\min}(\psi_i, S_1)/R(S_1)$ as its growing condition, while the remaining clusters examine the content value as well as the distance variation in their growing process. Condition 2 in Step 207 ensures that the cluster under processing contains the same amount of information as the first cluster, while Condition 3 prevents two frames which are very close to each other from being separated into different clusters. With Condition 2, some long video shots with large visual variations may be clustered into more than one cluster, and consequently, more than one keyframe will be assigned to these types of shots. On the other hand, with the combination of Condition 2 and 3, video shots with very similar visual contents will be clustered together, and only one keyframe will be assigned to this group of video shots. The above features of the inventive clustering method provide substantial advantages in comparison with existing clustering techniques.

In addition, Step 105 of the described summarization process provides for another unique feature of the inventive system. In particular, the inventive system is capable of outputting either an optimal set of keyframes, or a summarized version of the original video having a user-specified time length. When the keyframe output mode is selected by the user, the inventive system performs the singular value decomposition and clustering operations described above. From each obtained cluster, the system selects a frame whose feature vector is the closest to the center of the cluster and designates the selected frame as a keyframe.

Figure 3:
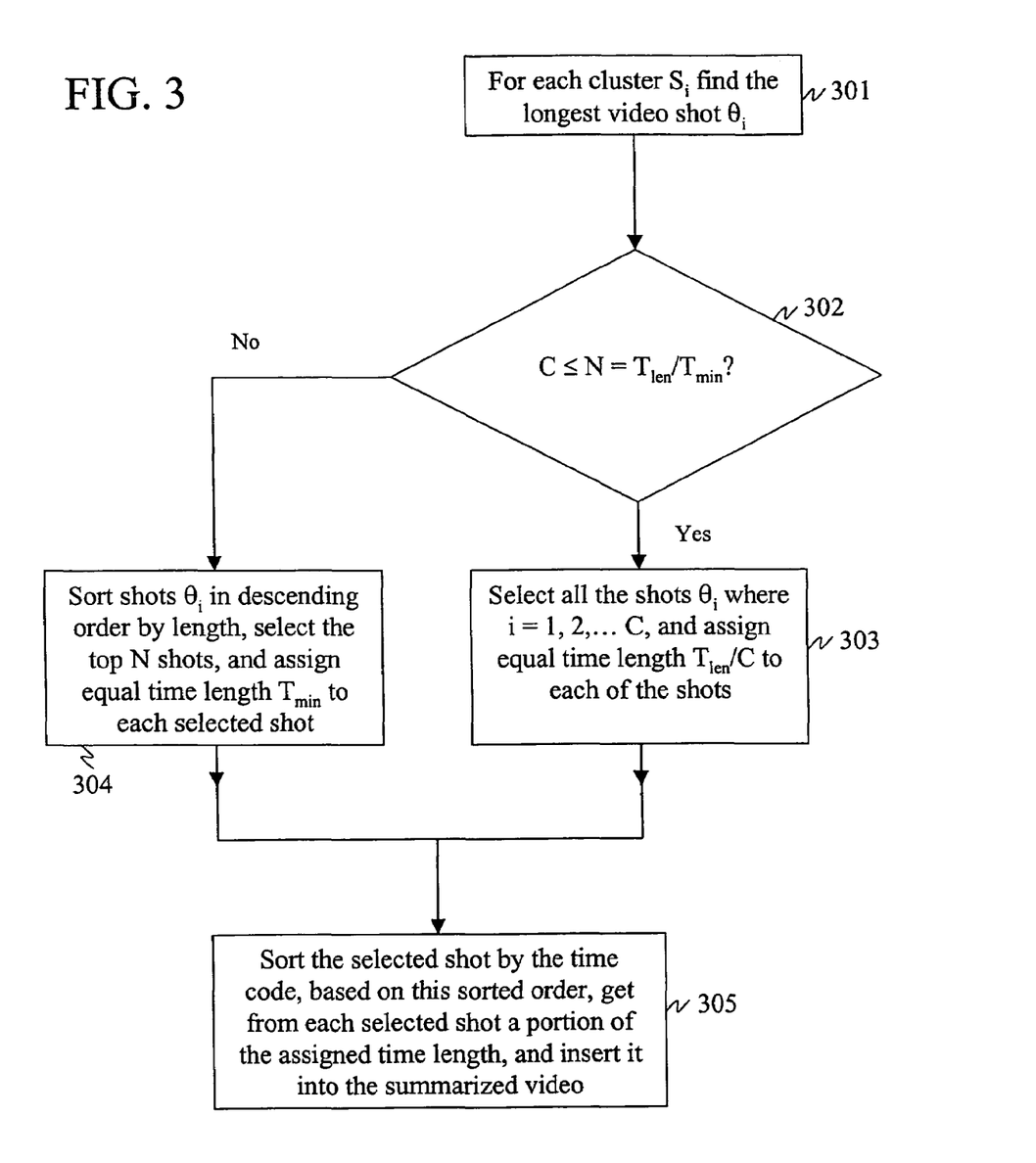
FIG. 3 is the block diagram of the inventive summary composition method.

The output of a summarized video requires more operations. The inventive system composes a summarized video according to two user-specified parameters: the time length of the summarized video $T_{len}$, and the minimum display time of each shot in the summarized video $T_{min}$. The process consists of the following main operations, as described with reference to FIG. 3:

Step 301. Let C be the number of clusters obtained from the above clustering process, and $N=T_{len}/T_{min}$. For each cluster $S_i$, find the longest video shot $\Theta_i$.

Step 302. If $C \leq N$, go to Step 303 below; otherwise, go to Step 304 below.

Step 303. Select all the shots $\Theta_i$ wherein i=1,2, ..., C, and assign an equal time length $T_{len}/C$ to each of the shots.

Step 304. Sort shots $\Theta_i$ in the descending order by their length, select the top N shots, and assign an equal time length $T_{min}$ to each selected shot.

Step 305. Sort the selected shots by the time code, based on this sorted order, get from each selected shot a portion of the assigned time length, and insert that portion into the summarized video.

Given the user-specified parameters $T_{len}$ and $T_{min}$, the maximum number of video shots, which can be included in the summarized video equals $N=T_{len}/T_{min}$. If the total number of shots $C \leq N$, then all the shots will be assigned a slot in the summarized video (Step 304); otherwise, the shots will be selected in descending order of their lengths to fill the summarized video (Step 304). Here, the parameter $T_{min}$ can be considered as a control knob for the user to select between depth-centric and breadth-centric summarization. A small value of $T_{min}$ will produce a breadth-centric video summary, which consists of a larger number of shots with shorter lengths, while a large value for $T_{min}$ will produce a depth-centric video summary consisting of fewer shots, each shot being longer in length. Moreover, because the clustering process is performed such that all the resultant clusters contain approximately the same amount of information, it is natural to assign the same time length to each selected shot in the summarized video.

The inventive video summarization system was implemented using C++ programming language and evaluated using a wide variety of input video sequences. The input video sequences used in the testing of the inventive system included news reports, documentary, political debates, and live coverage of various events. Each test video sequence lasted between 5 and 30 minutes. In one example, a summary of a 5-minute video documentary created by the inventive video summarization system, the test input video sequence consisted of 29 shots. Of those 29 shots, 15 major shots were put in rows. Each row of images represented one shot in the original input video sequence. The number of images in each row was proportional to the time length of the corresponding shot. Some rows of images represented keyframes assigned to some of the shots. The 13th shot (represented by row 13) was selected as the most static shot, and was used as the information unit to cluster the remaining shots. The anchorperson appeared two times, once at the beginning (row 1) of the sequence, and once at the end (row 15) thereof. However, because these two shots are quite similar in terms of visual content, and contain little motion, they were clustered together, and were assigned only one keyframe to the right in row 1. A similar situation took place for shots two and 14. Shot 12 was the longest shot in the sequence, and contained a lot of visual changes. Accordingly, it was clustered into three clusters together with shot ten, and was assigned three keyframes. Similarly, because shot 5 contained many visual changes, it was assigned two keyframes, as opposed to one. Besides the shown keyframe summary, the inventive video summarization system is capable of generating a motion video summary with a user-specified time length. The described experiment showed that a 30-second video summary produced by the inventive system contained the most important shots from the original video sequence.

Experiments using video sequences have shown that the inventive video summarization system is capable of effectively suppressing static and duplicate shots while assigning more keyframes to prolonged and dynamic video shots.

Video Segmentation and Classification Based on Singular Value Decomposition

The singular value decomposition technique described above was also used in the inventive video segmentation and classification system. Based on the aforementioned properties of the singular value decomposition, the present invention uses the distance metric defined by Equation (7) for the purposes of shot segmentation and matching, which is shown as follows:

$$SIM(i, j) = D(\psi_i, \psi_j) \qquad (9)$$

$$= \sqrt{\sum_{l=1}^{K} \sigma_l (v_{il} - v_{jl})^2},$$

wherein $\psi_i$, $\psi_j$ are vectors representing frames i and j in the refined feature space, respectively, and $\sigma_l$'s are the singular values obtained in the singular value decomposition.

In addition to the aforementioned important features, the singular value decomposition has the following additional property:

Property 3. The singular value decomposition of A is given by Equation (1), wherein $A=[A_1 \ldots A_i \ldots A_n]$, $V^T=[\psi_1 \ldots \psi_i \ldots \psi_n]$, $A_i=[a_{1i} a_{2i} \ldots a_{mi}]^T$, and $\psi_i=[v_{i1} v_{i2} \ldots v_{in}]^T$. Define the singular value weighted length of $\psi_i$ as:

$$\|\psi_i\|_\Sigma = \sqrt{\sum_{j=1}^{rank(A)} \sigma_j^2 v_{ij}^2}. \qquad (10)$$

where $\sigma_j$'s are the singular values.

Then, $\|\psi_i\|_\Sigma^2 = A_i \cdot A_i = \sum_{j=1}^{m} a_{ji}^2.$

Property 3 can be used as an indicator of the evenness of color distribution in frames and shots. Because $A_i$ is the concatenated histogram vector of frame i, the sum of its elements $a_{ji}$ is a constant C (which is equal to the number of pixels in the frame). Therefore, $\|\psi_i\|_\Sigma^2$ reaches its minimum when $a_{1i}=a_{2i}= \ldots =a_{mi}$, and it reaches its maximum when one of its elements $a_{ki}$ is equal to C and the remaining elements are all equal to zero. Accordingly, the singular value weighted length $\|\psi_i\|_\Sigma^2$ is proportional to the evenness of the color distribution of the corresponding frame i. This length becomes the shortest when substantially all colors are present in the frame i in substantially equal amounts (i.e. when frame i has substantially even color distribution), and it becomes the longest when the frame i contains only one color.

Figure 4:
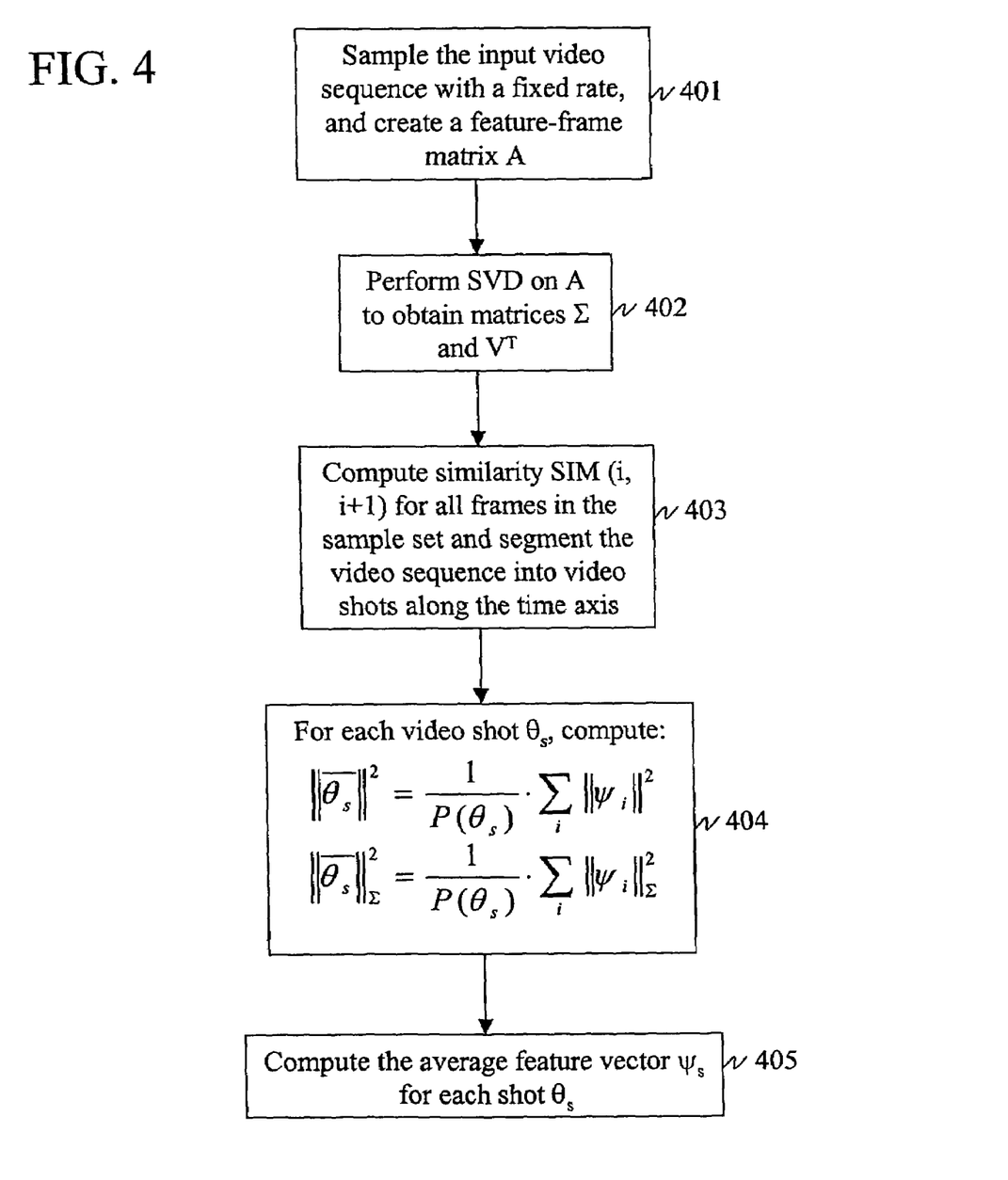
FIG. 4 is the block diagram of the inventive video segmentation and classification method.

A preferred embodiment of the inventive video segmentation and classification method comprises the following major steps, as depicted in FIG. 4:

Step 401. Sample the input video sequence with a fixed rate, preferably 10 frames per second, and create the feature-frame matrix A as described above.

Step 402. Perform singular value decomposition on the matrix A to obtain matrices $\Sigma=\text{diag}(\sigma_1, \sigma_2, \ldots, \sigma_n)$ and $V^T=[\psi_1 \ldots \psi_i \ldots \psi_n]$.

Step 403. Compute the similarity SIM(i, i+1) defined by Equation (9) for all the frames in the sample set, and segment the video sequence into video shots along the time axis (see the following segmentation algorithm for the detail).

Step 404. For each video shot $\Theta$s, compute the following two average lengths:

$$\|\Theta s\|^2 = \frac{1}{P(\Theta s)} \cdot \sum_i \|\psi_i\|^2 \qquad (11)$$

$$\|\Theta s\|_\Sigma^2 = \frac{1}{P(\Theta s)} \cdot \sum_i \|\psi_i\|_\Sigma^2, \qquad (12)$$

wherein $\psi_i \in \Theta s$, and $P(\Theta s)$ is the number of frames included in shot $\Theta s$. The above two values indicate the degree of visual changes, and the evenness of color distributions in the shot $\Theta s$, respectively.

Step 405. Compute the average feature vector $\Psi s$ for each shot $\Theta s$. Distance $D(\Psi_X, \Psi_Y)$ defines the visual similarity between shots $\Theta_Z$ and $\Theta_Y$.

In the above embodiment of the inventive algorithm, Steps 401 and 402 perform singular value decomposition for the shot segmentation; Step 403 conducts the shot segmentation itself; and Steps 404 and 405 compute the metrics for each detected shot to enable the assessment of the color distributions, dynamic levels, and visual similarities of all the shots in the video sequence.

Figure 5:
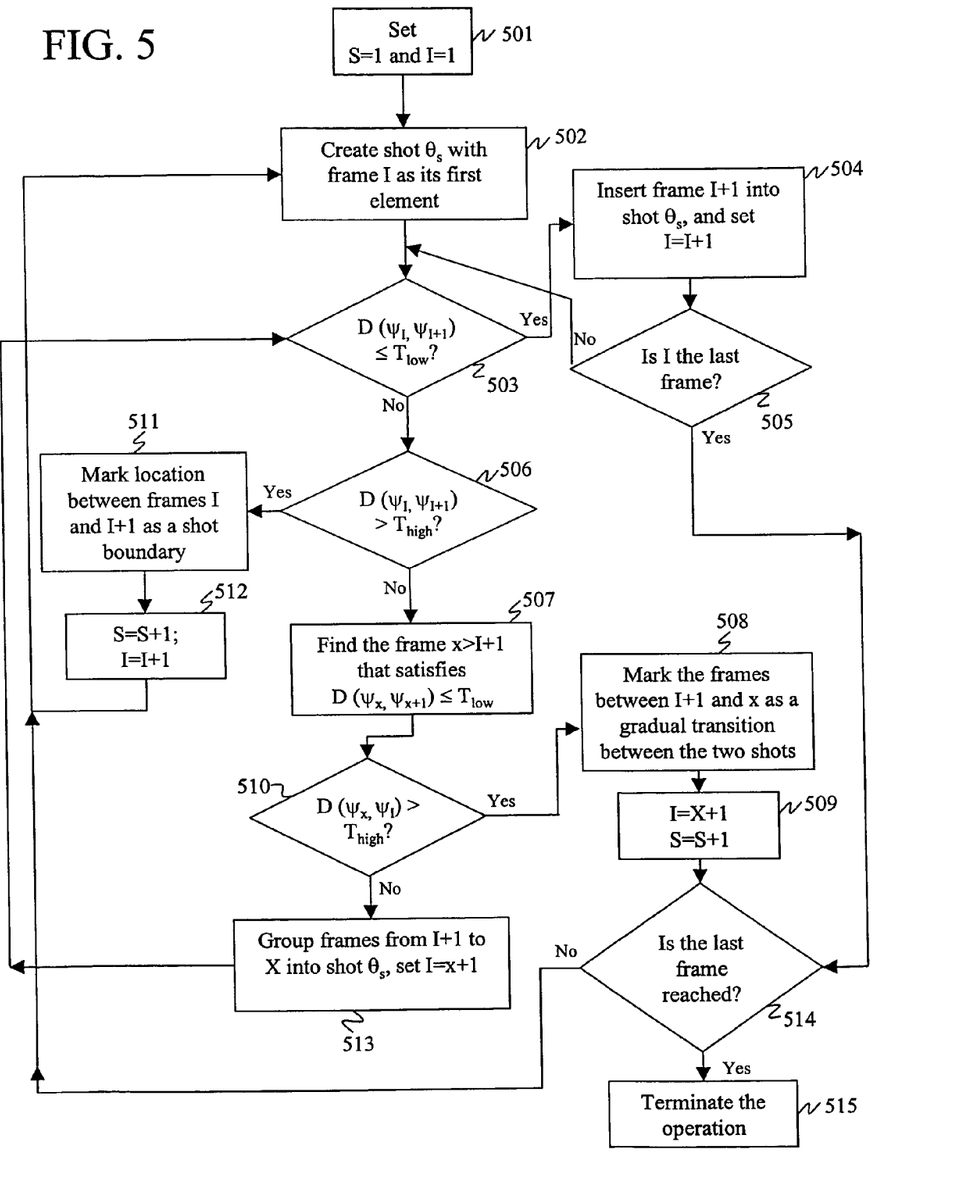
FIG. 5 is the block diagram of the inventive shot segmentation method.

The step of shot segmentation (Step 403) involves two thresholds, $T_{low}$ and $T_{high}$. If the distance between two consecutive frames is below $T_{low}$, the two frames will be grouped into the same shot without further examination. If this distance is above $T_{high}$, a shot boundary will be declared. If this distance is between $T_{low}$ and $T_{high}$, further examination involving more video frames will be performed to determine if the detected large distance is caused by the temporary variation, or a gradual scene transition. The following algorithm describes the implementation of the preferred embodiment of the inventive shot segmentation method, as depicted in FIG. 5:

Step 501. Set shot counter S=1, and frame index I=1.

Step 502. Create shot $\eta$s with frame I as its first element.

Step 503. If $D(\psi_I, \psi_{I+1}) \leq T_{low}$, then insert frame I+1 into shot $\Theta$s and increment I by one (Step 504). Repeat this step if I is not the last frame (Step 505); otherwise, go to Step 514.

Step 506. If $D(\psi_I, \psi_{I+1}) > T_{high}$, mark the location between frames I and I+1 as a shot boundary and increment S and I by one. Then, return to Step 502.

If $T_{low} < D(\psi_I, \psi_{I+1}) \leq T_{high}$, do the following:

Step 507. Find a frame X>I+1 which satisfies the condition $D(\psi_I, \psi_{I+1}) \leq T_{low}$ (Step 507).

Step 510. If $D(\psi_X, \psi_I) > T_{high}$, mark the frames between I+1 and X as a gradual transition between the two scene shots (Step 508); set I=X+1, and increment the shot counter S by one (Step 508). Then, go to Step 514.

If $D(\psi_I, \psi_{I+1}) \leq T_{high}$, group frames from I+1 to X into shot $\Theta$s, and set I=X+1 (Step 513). Then, return to Step 503.

Step 514. If the last frame has been reached, terminate the entire operation;

otherwise, return to Step 502.

TABLE 1

Evaluation of a Preferred Embodiment of the Inventive Video Segmentation and Classification System

| | Abrupt Shot Cut | | Gradual Transition | | Shot Classification | |
|---|---|---|---|---|---|---|
| | Recall | Precision | Recall | Precision | Recall | Precision |
| Local Histogram Method | 92.6% | 72.1% | — | — | — | — |
| Inventive Method | 97.3% | 92.7% | 94.3% | 87.0% | 90.2% | 85.1% |

A preferred embodiment of the inventive video shot segmentation and classification system was evaluated using a total of two hours of CNN news video programs. The used video footage contained almost all possible video editing effects such as abrupt scene changes, fades, wipes, dissolves, etc. The used footage also contained a great variety of scene categories such as portraits, landscapes, interviews, crowds, moving camera/objects, etc. For the sake of comparison, a local histogram-based shot segmentation method was also implemented and evaluated using the same set of video programs. The aforementioned local histogram method was chosen for comparison with the inventive method because its performance was reported to be one of the best among the existing segmentation techniques. See J. Boreczky and L. Rowe, "Comparison of video shot boundary detection techniques," in *Proceedings of SPIE: Storage and Retrieval for Image and Video Databases IV*, vol. 2670, 1996. The experimental results are listed in Table 1.

Persons of skill in the art will undoubtedly appreciate that for abrupt shot cut detection, the inventive system provides a remarkable improvement in recall and precision over the conventional technique. Such dramatic improvements are achieved because of the frame comparison in the truncated feature space derived from the singular value decomposition, and the use of the two thresholds $T_{high}$ and $T_{low}$ which divide the entire domain of the frame distance into the low, gray, and high zones. As set forth above, if the distance between two consecutive frames falls into the gray zone, more frames will be examined to determine if the large distance is due to the presence of video noise, jitters from camera/object motions, or the genuine scene change. This inventive approach greatly reduces outliers and results in a high recall, high precision rates of the shot boundary detection. As well known to persons of ordinary skill in the art, the term outliers refers to the detected scene changes caused not by the changes in the video content, but by secondary effects such as camera jitter.

In addition, the inventive system is also capable of detecting gradual scene transitions, and classifying the detected shots into four categories such as identical shots, shots with high degree variations, static shots without remarkable changes, and shots with a uniform color (e.g., black/white frames). In many video programs, the same persons or the same scenes appear repeatedly (e.g. anchorpersons, interviewers/interviewees). Finding these identical scenes is essential for detecting and eliminating duplicates and redundancies, which is critical for generating concise video content summaries. On the other hand, dynamic shots with abundant variations may contain either camera pans and zooms, which aim at capturing the entire event, or dramatic object motions, which come from highly dynamic scenes. The ability to identify dynamic shots is extremely important to achieving the ultimate goal of detecting visually important scenes.

Finally, because black or white frames often appear around scene shot boundaries, for example right before or right after TV commercials, detecting these kinds of frames is useful for many applications. In order to conserve the memory resources, the recall and precision values for shot classification are obtained by averaging the recall and precision values of the aforementioned four shot categories.

From the above table, it will become clear to those of skill in the art that the inventive system has achieved a competitive performance in the gradual scene transition detection as well as the shot classification. In contrast to many traditional shot classification systems, which rely heavily on heuristic rules and sets of thresholds, the inventive system classifies shots based on the metrics derived from the properties of the singular value decomposition. This feature of the present invention provides for simple, robust, and accurate classification of video shots.

Accordingly, it will be readily appreciated by persons of skill in the art that the inventive shot segmentation and classification system based on singular value decomposition successfully achieves the aforementioned goals of accurate video shot segmentation and visual content-based shot classification.

While the invention has been described herein using preferred embodiments thereof, it will be readily appreciated by those skilled in the art that various modifications in form and detail may be made therein without departing from the scope and spirit of the invention, as defined in and by the appended claims.

What is claimed is:

1. A method for determining a similarity between a first and a second frame in an input video sequence comprising a plurality of frames, said method comprising:
    calculating a refined feature space representation of said input video sequence to generate a plurality of refined frames;
    using said calculated refined feature space representation to compute said similarity between said first and said second frame; and
    grouping said plurality of refined frames including the first and the second frame into a plurality of video shots, wherein the grouping is determined using a minimum threshold for frame inclusion, a maximum threshold for frame exclusion, and a threshold range from the minimum threshold to the maximum threshold, for which threshold range further analysis is performed,
    wherein the refined feature space representation is a matrix, wherein each column of said matrix represents a frame in a refined feature space corresponding to a frame in said plurality of frames.

2. The method of claim 1, wherein in said calculating the refined feature space representation, said refined feature space representation is calculated using a singular value decomposition.

3. A computer-readable storage medium containing a program for executing a method of determining a similarity between a first and a second frame in an input video sequence comprising a plurality of frames, said method comprising:

calculating a refined feature space representation of said input video sequence to generate a plurality of refined frames;

using said calculated refined feature space representation to compute said similarity between said first and said second frame; and grouping said plurality of refined frames including the first and the second frame into a plurality of video shots, wherein the grouping is determined using a minimum threshold for frame inclusion, a maximum threshold for frame exclusion, and a threshold range from the minimum threshold to the maximum threshold, for which threshold range further analysis is performed, wherein the refined feature space representation is a matrix, wherein each column of said matrix represents a frame in a refined feature space corresponding to a frame in said plurality of frames.

4. The computer-readable storage medium of claim 3, wherein in said calculating the refined feature space representation, said refined feature space representation is calculated using a singular value decomposition.

5. The method of claim 1, wherein said grouping comprises including two consecutive frames, among the plurality of the refined frames, in a video shot if a distance between the two consecutive frames is below the minimum threshold, and if the distance between the two consecutive frames is above the maximum threshold, declaring a shot boundary between the consecutive frames.

6. The computer-readable storage medium of claim 3, wherein said grouping comprises including two consecutive frames, among the plurality of the refined frames, in a video shot if a distance between the two consecutive frames is below the minimum threshold, and if the distance between the two consecutive frames is above the maximum threshold, declaring a shot boundary between the consecutive frames.

* * * * *